United States Patent
Strengert et al.

(10) Patent No.: US 9,908,416 B2
(45) Date of Patent: Mar. 6, 2018

(54) METHOD FOR BLENDING A GENERATOR BRAKING TORQUE OF A GENERATOR OF A RECUPERATIVE BRAKE SYSTEM HAVING TWO BRAKE CIRCUITS, AND A CONTROL DEVICE FOR A RECUPERATIVE BRAKE SYSTEM HAVING TWO BRAKE CIRCUITS

(71) Applicant: Robert Bosch GmbH, Stuttgart (DE)

(72) Inventors: Stefan Strengert, Stuttgart (DE); Michael Kunz, Steinheim an der Murr (DE)

(73) Assignee: ROBERT BOSCH GMBH, Stuttgart (DE)

( * ) Notice: Subject to any disclaimer, the term of this patent is extended or adjusted under 35 U.S.C. 154(b) by 272 days.

(21) Appl. No.: 14/359,717

(22) PCT Filed: Sep. 24, 2012

(86) PCT No.: PCT/EP2012/068730
§ 371 (c)(1),
(2) Date: May 21, 2014

(87) PCT Pub. No.: WO2013/075862
PCT Pub. Date: May 30, 2013

(65) Prior Publication Data
US 2014/0288797 A1    Sep. 25, 2014

(30) Foreign Application Priority Data

Nov. 21, 2011 (DE) .................. 10 2011 086 706

(51) Int. Cl.
*B60L 7/18* (2006.01)
*B60T 13/74* (2006.01)
*B60T 8/48* (2006.01)

(52) U.S. Cl.
CPC .............. *B60L 7/18* (2013.01); *B60T 8/4872* (2013.01); *B60T 13/745* (2013.01); *B60T 2270/604* (2013.01)

(58) Field of Classification Search
CPC ........ B60L 7/18; B60T 8/4872; B60T 13/745; B60T 2270/604
(Continued)

(56) References Cited

U.S. PATENT DOCUMENTS

RE44,677 E  *  12/2013  Campau ................ B60T 7/042
                                               303/113.4
2010/0276239 A1*  11/2010  Wuerth ................ B60T 8/266
                                               188/358

FOREIGN PATENT DOCUMENTS

CN    101909957 A    12/2010
CN    102056779 A    5/2011
(Continued)

*Primary Examiner* — Redhwan K Mawari
*Assistant Examiner* — Rodney P King
(74) *Attorney, Agent, or Firm* — Norton Rose Fulbright US LLP; Gerard Messina (57) ABSTRACT

A method for blending a generator braking torque of a generator of a recuperative brake system having two brake circuits, including: controlling one of the at least two brake circuits of the brake system in a blending mode, a hydraulic connection between a master brake cylinder of the brake system and a storage volume of the brake circuit controlled in the blending mode being at least temporarily enabled, so that brake fluid is transferred from the master brake cylinder into the storage volume of the brake circuit controlled in the blending mode; and controlling another of the at least two brake circuits in a non-blending mode, a hydraulic connection between the master brake cylinder and a storage volume of the brake circuit controlled in the non-blending mode being interrupted during the non-blending mode. Also (Continued)

described is a control device for a recuperative brake system having two brake circuits.

19 Claims, 6 Drawing Sheets

(58) Field of Classification Search
USPC .......................................................... 701/70
See application file for complete search history.

(56) References Cited

FOREIGN PATENT DOCUMENTS

| | | |
|---|---|---|
| DE | 196 04 134 | 8/1997 |
| WO | 2004/101308 | 11/2004 |
| WO | 2011/092308 | 8/2011 |

\* cited by examiner

METHOD FOR BLENDING A GENERATOR BRAKING TORQUE OF A GENERATOR OF A RECUPERATIVE BRAKE SYSTEM HAVING TWO BRAKE CIRCUITS, AND A CONTROL DEVICE FOR A RECUPERATIVE BRAKE SYSTEM HAVING TWO BRAKE CIRCUITS

FIELD OF THE INVENTION

The present invention relates to a method for blending a generator braking torque of a generator of a recuperative brake system having two brake circuits. The present invention also relates to a method for operating a recuperative brake system of a vehicle, having at least two brake circuits. In addition, the present invention relates to a control device for a recuperative brake system having two brake circuits, as well as to a regenerative brake system having a control device.

BACKGROUND INFORMATION

A method and a device for controlling a brake system of a motor vehicle having an electrical drive unit and two brake circuits is described in DE 196 04 134 A1. When the vehicle is decelerated using the electrical drive unit for simultaneously charging a battery, the hydraulic braking torque applied to at least one wheel by the wheel brake cylinders of the two brake circuits should be reduced/deactivated in spite of manipulation of the brake pedal. To that end, the pressure medium displaced from the master brake cylinder to the wheel brake cylinders via manipulation of the brake pedal should be counteracted, in that the pressure medium displaced from the master brake cylinder is transferred into the accumulators of the two brake circuits by opening the exhaust valves of the two brake circuits. In this manner, regenerative braking carried out by the electrical drive unit should be able to be blended. If the exhaust valves used may only be activated for a short time due to thermal reasons, the two exhaust valves of a brake circuit should be activated in an alternating manner.

SUMMARY OF THE INVENTION

The present invention provides a method for blending a generator braking torque of a generator of a recuperative brake system having two brake circuits, where the method includes the features described herein; a method for operating a recuperative brake system of a vehicle having at least two brake circuits, where the method includes the features described herein; a control device for a recuperative brake system having two brake circuits, where the control device includes the features described herein; and a regenerative brake system having a control device, where the regenerative brake system includes the features described herein.

The present invention implements the advantageous procedure for blending a generator braking torque (not equal to zero), using an accumulator charge, which method produces an improved braking performance in spite of a fault and/or produces a more uniform loading of the storage volumes/ accumulators over their lifetime/total operating time.

While the conventional blending via simultaneous enabling of a first hydraulic connection between the master brake cylinder and a storage volume of the first brake circuit and a second hydraulic connection between the master brake cylinder and a storage volume of the second brake circuit causes the pedal travel to increase considerably in the case of a fault, this disadvantage is eliminated by the present invention. If the exhaust valves are mistakenly opened when the two hydraulic connections are simultaneously enabled in the conventional manner, then the driver must first fill the two storage volumes/accumulators completely by applying a braking force to the brake actuating element/brake pedal, before a hydraulic braking torque of at least one of the wheel brake cylinders of the two brake circuits may be built up. Conventionally, this disadvantage is also present when no generator braking torque not equal to zero is able to be provided by the generator, for example, since an energy store chargeable by the generator is already charged completely, and/or a speed of the vehicle equipped with the generator is less than a minimum speed for using the generator. In contrast, the present invention prevents simultaneous enabling of the two hydraulic connections for regenerative braking. Therefore, after filling the storage volume of only the brake circuit controlled in the blending mode, using the driver's braking force, the driver may build up a hydraulic braking torque and consequently decelerate the vehicle reliably and in a simple manner, in spite of a fault, for example, due to an undetected functional impairment of the generator. Thus, the present invention provides an improved safety standard of a recuperative brake system.

In comparison with the conventional, simultaneous enabling of the two hydraulic connections, the present invention also has the advantage that components of the storage volumes/accumulators, such as their seals, may be better protected. In the case of the conventional, simultaneous enabling of the two hydraulic connections, the one of the at least two accumulators that is initially filled is a function of the manufacturing tolerances of the storage volumes/ accumulators. One may also describe this, such that in the case of conventional, simultaneous enabling of the two hydraulic connections, as a rule, the different operating forces of the storage volumes result in the storage volume/ the accumulator having the lower operating force being filled. Thus, the storage volume/accumulator having the lower operating force is loaded considerably more heavily. (For example, in the case of the conventional procedure, a seal of the accumulator having the lower operating force is displaced considerably more.) Therefore, due to the conventional, simultaneous enabling of the two hydraulic connections, the time of use/service life of the storage volume having the lower operating force is often limited significantly.

The present invention allows a total collective loading to be distributed more uniformly over the at least two accumulators of the at least two brake circuits. This uniform sharing of the collective loading over the at least two storage volumes increases the time of use/service life of the storage volumes. Consequently, costs conventionally occurring in the case of a repair or in the case of replacement of a storage volume/accumulator may be saved.

Advantageously, the hydraulic connection between the master brake cylinder and the storage volume of the brake circuit controlled in the blending mode may be enabled at least temporarily, by forcing at least one valve of the brake circuit controlled in the blending mode into an at least partially open state at least temporarily. In the same manner, the hydraulic connection between the master brake cylinder and the storage volume of the brake circuit controlled in the non-blending mode may be interrupted during the non-blending mode, by forcing at least one valve of the brake circuit controlled in the non-blending mode into its closed state during the non-blending mode. Consequently, a hydraulic connection may be enabled or a hydraulic connection may be interrupted in a simple manner.

For example, at least one wheel exhaust valve, as the at least one valve of the brake circuit controlled in the blending mode, may be forced at least temporarily into an at least partially open state. Correspondingly, at least one wheel exhaust valve, as the at least one valve in the brake circuit controlled in the non-blending mode, may be forced into its closed state during the non-blending mode. Therefore, as a rule, at least one valve already present in a brake circuit may be used for enabling a hydraulic connection or choking off a hydraulic connection.

As an alternative to that, a high-pressure control valve, as the at least one valve of the brake circuit controlled in the blending mode, may also be forced at least temporarily into an at least partially open state. In a corresponding manner, a high-pressure control valve, as the at least one valve of the brake circuit controlled in the non-blending mode, may be forced into its closed state during the non-blending mode. The use of a high-pressure control valve as the at least one controlled valve for enabling or interrupting a hydraulic connection between the master brake cylinder and the at least one associated accumulator volume has the advantage that the volume of brake fluid forced out of the master brake cylinder is displaced into the respective accumulator volume while by-passing a wheel brake caliper/wheel brake cylinder. Therefore, a residual build-up of brake pressure due to displacement of the volume of brake fluid from the master brake cylinder into the respective accumulator volume via the wheel brake calipers/the wheel brake cylinders is not to be feared.

The advantages listed in the paragraphs above are also provided in a corresponding method for operating a recuperative brake system of a vehicle, having at least two brake circuits.

In one advantageous further refinement, if a generator braking torque greater than a specified minimum generator braking torque is exerted by the controlled generator and the ascertained braking intensity variable is between the specified, first braking intensity value and the specified, second braking intensity value, a brake circuit of the at least two brake circuits that is set as a first brake circuit is controlled in the blending mode, and a further brake circuit of the at least two brake circuits that is defined as a second brake circuit is controlled in the non-blending mode. Consequently, a storage volume of the second brake circuit may be selectively protected. In this context, for instance, a more intensely loaded and/or older accumulator volume may be protected, so that its exchange/repair due to a failure of the storage volume caused by loading it too highly may be prevented.

In addition to the above-described method step, if a generator braking torque greater than a specified minimum generator braking torque is exerted by the controlled generator and the ascertained braking intensity variable is between the specified, second braking intensity value and a specified, third braking intensity value greater than the second braking intensity value, the second brake circuit may be controlled in the blending mode, and the first brake circuit may be controlled in the non-blending mode. This produces a more uniform distribution of the use/loading of the at least two storage volumes of the at least two brake circuits.

Alternatively, if a generator braking torque not equal to zero is exerted by the controlled generator and the ascertained braking intensity variable is between the specified, second braking intensity value and the specified, third braking intensity value, the first brake circuit and the second brake circuit may also be controlled in the blending mode. This may be accomplished by enabling the hydraulic connection between the master brake cylinder and the storage volume of the first brake circuit and the hydraulic connection between the master brake cylinder and the storage volume of the second brake circuit. Consequently, when the brake actuating element/brake pedal is manipulated comparatively strongly, the two storage volumes may be used for blending a comparatively high generator braking torque.

In one specific embodiment, after the method is executed, the first brake circuit is reset as the second brake circuit, and the second brake circuit is reset as the first brake circuit. One may also describe this as a constant permutation of the opening order of the at least two storage volumes of the at least two brake circuits. This ensures that the total collective loading is distributed uniformly over the at least two storage volumes/accumulators in an advantageous manner.

In one advantageous specific embodiment, after the method is executed, a first variable regarding a total fluid volume received during operation of a storage volume of one of the at least two brake circuits is compared to at least a second variable regarding a total fluid volume received during operation of a storage volume of another of the at least two brake circuits. Subsequently, the brake circuit having the minimum variable of at least the first variable and the second variable is reset as the first brake circuit. One may also describe this as setting the opening order on the basis of the cumulative, received volume of each of the storage volumes/accumulators. Therefore, in this specific embodiment, the storage volume, which, with a relatively high probability, withstands renewed use due to its comparatively low loading up to now, may be used for blending. At the same time, the storage volume, which, with a high probability, could already be damaged by reuse due to frequent and/or intense use, is purposefully protected through non-use.

To provide the above-mentioned advantages, a corresponding control device for a recuperative brake system having at least two brake circuits may also be used.

For example, at least one valve of the brake circuit controlled in the blending mode may be at least temporarily forced by the first control signal into an at least partially open state. In the same way, at least one valve of the brake circuit controlled in the non-blending mode may be forced by the second control signal into its closed state during the non-blending mode. The at least one valve may be at least one wheel exhaust valve and/or high-pressure control valve. Consequently, as a rule, valves that are already installed in the brake system may be used together with the advantageous specific embodiment of the control device. In this manner, the costs and an overall space requirement of the recuperative brake system interacting with the control device may be reduced. However, it should be pointed out that in place of, or in addition to the valves listed here, other valves may also be used for enabling/interrupting a hydraulic connection.

The control device may include a second receiving device, by which a braking intensity signal may be received and a braking intensity variable corresponding to a braking intensity signal may be provided. In this case, the control device is also advantageously configured to compare the provided braking intensity variable to at least a specified, first braking intensity value and a specified, second braking intensity value greater that the first braking intensity value. Consequently, if the exerted or exertable generator braking torque is greater than the specified minimum braking torque and the braking intensity variable is between the specified, first braking intensity value and the specified, second braking intensity value, the control device may be configured to control a brake circuit of the at least two brake circuits, which is set as a first brake circuit, in the blending mode, and to control another brake circuit of the at least two brake circuits, which is set as a second brake circuit, in the non-blending mode. Therefore, the first brake circuit may be selectively used in order to protect the second brake circuit.

In addition, if the exerted or exertable generator braking torque is greater than the specified minimum generator braking torque and the braking intensity variable is greater than the specified, second braking intensity value, the control device may be configured to control at least the second brake circuit in the blending mode. In this manner, the storage volume of the first brake circuit, which is controlled in either the blending mode or in the non-blending mode, may be at least temporarily protected.

In a further refinement, the control device additionally includes a comparison device, with the aid of which a first variable regarding a total fluid volume received during operation of a storage volume of one of the at least two brake circuits may be compared to at least a second variable regarding a total fluid volume received during operation of a storage volume of another of the at least two brake circuits. In addition, the comparison device is also configured to reset the brake circuit having the minimum variable of at least the first variable and the second variable as the first brake circuit. Therefore, using the control device described here, the opening order may also be set in light of the cumulative, received volume. As an alternative to that, the control device may also be configured to constantly permute the opening order.

The above-mentioned advantages are also provided in a generative brake system having a corresponding control device.

Additional features and advantages of the present invention are explained below, with reference to the figures.

DETAILED DESCRIPTION

FIG. 1a through 1d show a schematic overall view and three schematic partial views for explaining a specific embodiment of the method for blending a generator braking torque.

Figure 1A:
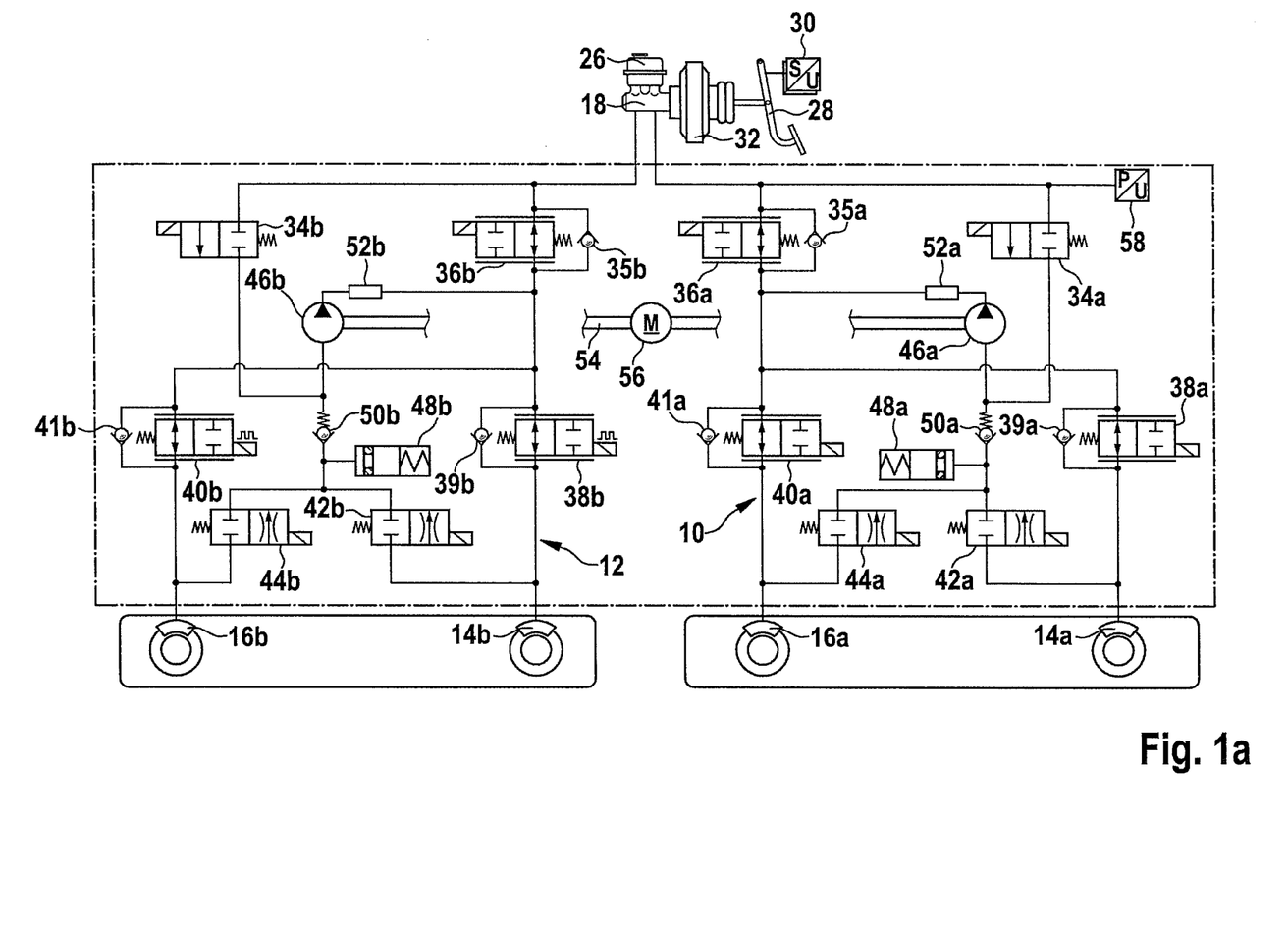
FIG. 1a through 1d show a schematic overall view and three schematic partial views for explaining a specific embodiment of the method for blending a generator braking torque.

The brake system, which is schematically represented in FIG. 1a and may be operated with the aid of the method described, may be advantageously used, for example, in a hybrid vehicle and in an electric vehicle. However, the ability to use the brake system operated by the method described in the following is not limited to a hybrid or electric vehicle.

The brake system has a first brake circuit 10 including at least one wheel brake caliper 14a and 16a. In addition, the brake system also has a second brake circuit 12 including at least one wheel brake caliper 14b and 16b. For example, the brake system includes a first brake circuit 10 having a first wheel brake caliper 14a and a second wheel brake caliper 16b, as well as a second brake circuit 12 having a third wheel brake caliper 14b and a fourth wheel brake caliper 16b. In this case, the brake system may be configured for a vehicle having an x-type brake circuit distribution. In this case, first wheel brake caliper 14a and third wheel brake caliper 14b are assigned to a first vehicle axle, while second wheel brake caliper 16a and fourth wheel brake caliper 16b are assigned to another vehicle axle. In particular, the wheels assigned to a brake circuit 10 and 12 may be positioned diagonally at the vehicle. For example, first wheel brake caliper 14a and third wheel brake caliper 14b may be assigned to the front axle, while second wheel brake caliper 16a and fourth wheel brake caliper 16b may be assigned to the rear axle. However, the brake system described below is not limited to an x-type brake circuit distribution. Instead, the brake system may also be used when the wheels assigned to a common brake circuit 10 or 12 are positioned axially or on one side of the vehicle.

The brake system has a master brake cylinder 18, which may take the form of a tandem master brake cylinder, for example. Master brake cylinder 18 may have at least one displaceable master brake cylinder piston 20 and 22 (shown only in FIG. 1b through 1d), which is at least partially displaceable in at least one pressure chamber 24a or 24b of master brake cylinder 18. Master brake cylinder 18 may include a first displaceable piston (primary piston), which may be referred to as a rod piston 20 and extends at least partially into a first pressure chamber 24a of master brake cylinder 18 assigned to first brake circuit 10, as well as a second displaceable piston (secondary piston), which may be referred to as a floating piston 22 and extends at least partially into a second pressure chamber 24b of master brake cylinder 18 assigned to second brake circuit 12. In one specific embodiment, floating piston 22 is displaceable in such a manner, that when floating piston 22 is displaced in a first direction, the first inner volume of first pressure chamber 24a decreases, while the inner volume of second pressure chamber 24b increases. Correspondingly, the inner volume of first pressure chamber 24a may be increased and the inner volume of second pressure chamber 24b may be decreased, by displacing floating piston 22 in a second direction. However, the brake system is not limited to the use of a tandem master brake cylinder or a particular construction of master brake cylinder 18. Master brake cylinder 18 may be connected to a brake medium reservoir 26 via at least one brake fluid exchange opening, such as an expansion bore.

The brake system may have a brake actuating element 28, such as a brake pedal, situated at master brake cylinder 18. Brake actuating element 28 is advantageously positioned at master brake cylinder 18 such that when brake actuating element 28 is manipulated at at least a minimum intensity, a driver's braking force applied to brake actuating element 28 is transmittable to at least one displaceable master brake cylinder piston 20 and 22, such as rod piston 20 and floating piston 22, in such a manner, that master brake cylinder piston 20 and 22 is displaceable with the aid of the driver's braking force. Using this displacement of the master brake cylinder piston, an internal pressure in at least one pressure chamber 24a and 24b of master brake cylinder 18 may be increased.

The brake system may also include at least one brake actuating element sensor 30, with the aid of which the actuating intensity (braking intensity variable) of the manipulation of brake actuating element 28 by the driver is ascertainable. Brake actuating element sensor 30 may include, for example, a braking force sensor, a brake pressure sensor, a pedal travel sensor, a differential travel sensor and/or a rod displacement sensor. However, in order to measure the actuating intensity (braking intensity variable), which corresponds to the driver's braking command, a different type of sensor system may also be used in place of, or in addition to the types of sensors enumerated here.

In one specific embodiment, the illustrated brake system also has a brake booster 32, such as a vacuum brake booster. In place of a vacuum brake booster, the brake system may also include another type of brake booster 32, such as a hydraulic and/or an electromechanical boosting device. In particular, brake booster 32 may be a continuously adjustable/continuously controllable brake booster 32.

In the following, further components of the brake system, which is operated with the aid of the specific embodiment of the method for blending a generator braking torque, are described with reference to FIG. 1a. It is expressly pointed out that the brake system components described in the following constitute merely an example of a possible construction of a brake system able to be operated/controlled/more effectively used with the aid of the method. Above all, an advantage of the method for blending a generator braking torque is that brake circuits 10 and 12 are not limited to a particular construction or to the use of particular components. Instead, brake circuits 10 and 12 may be modified with a high degree of freedom of choice, without affecting the advantages of the specific embodiment of the method for blending a generator braking torque:

Each of brake circuits 10 and 12 is formed with a high-pressure control valve 34a and 34b and a switch-over valve 36a and 36b (having a bypass line running parallel to it and a check valve 35a and 35b positioned in the bypass line) in such a manner, that the driver is able to directly apply braking force to wheel brake calipers 14a, 14b, 16a and 16b via master brake cylinder 18. In first brake circuit 10, first wheel brake caliper 14a and second wheel brake caliper 16a are assigned a first wheel intake valve 38a and a second wheel intake valve 40a, which each have a bypass line running parallel to them and a respective check valve 39a and 41a situated in each bypass line. In addition, a first wheel exhaust valve 42a is assigned to first wheel brake caliper 14a, and a second wheel exhaust valve 44a is assigned to second wheel brake caliper 16a. Correspondingly, in second brake circuit 12, a third wheel intake valve 38b may also be assigned to third wheel brake caliper 14b, and a fourth wheel intake valve 40b may also be assigned to third wheel brake caliper 16b. In each instance, a bypass line and a check valve 39b and 41b positioned in it may run in parallel with each of the two wheel intake valves 38b and 40b, respectively, of second brake circuit 12. In addition, in second brake circuit 12, a third wheel exhaust valve 42b may also be assigned to third wheel brake caliper 14b, and a fourth wheel exhaust valve 44b may also be assigned to fourth wheel brake caliper 16b.

In addition, each of brake circuits 10 and 12 includes a pump 46a and 46b, whose suction side is connected to wheel exhaust valves 42a and 44a or 42b and 44b, and whose delivery side is directed towards corresponding switch-over valve 36a or 36b. Brake circuits 10 and 12 may also include an accumulator 48a or 48b (e.g., low-pressure accumulator) situated between wheel exhaust valves 42a and 44a or 42b and 44b and pump 46a or 46b, as well as a pressure-relief valve 50a or 50b situated between pump 46a or 46b and accumulator 48a or 48b. As an option, each of the two brake circuits 10 and 12 may also include a smoothing filter 52a or 52b, which may be positioned at a delivery side of respective pump 46a or 46b. A delivery stream generated by the at least one pump 46a and 46b may be smoothed by such a pump smoothing filter 52a and 52b.

Pumps 46a and 46b may be positioned on a common shaft 54 of an engine 56. Each of pumps 46a and 46b may take the form of a three-piston pump. However, another type of pump may also be used in place of a three-piston pump for at least one of pumps 46a and 46b. Differently configured modulation systems, such as pumps having more or fewer pistons, asymmetric pumps or gear pumps, may also be used. In addition, each of the two brake circuits 10 and 12 may even include at least one pressure sensor 58, in particular, at a supply line of a first wheel brake caliper 14a and/or third wheel brake caliper 14b used as a front axle brake caliper.

Therefore, the brake system may be implemented as a modified standard modulation system, in particular, as a six-piston ESP system.

Once again, it is emphasized that the use of the above-described brake system with the aid of the method explained below is only to be interpreted as exemplary. The ability to implement the method described in the following is not limited to the use of such a brake system. In particular, the layout of the above-described brake system having its listed components is merely to be interpreted as exemplary.

The brake system is configured as a recuperative brake system having at least one generator (not sketched). An advantageous procedure for blending a generator braking torque (not equal to zero) of the generator during deceleration is discussed below.

Figure 1B:
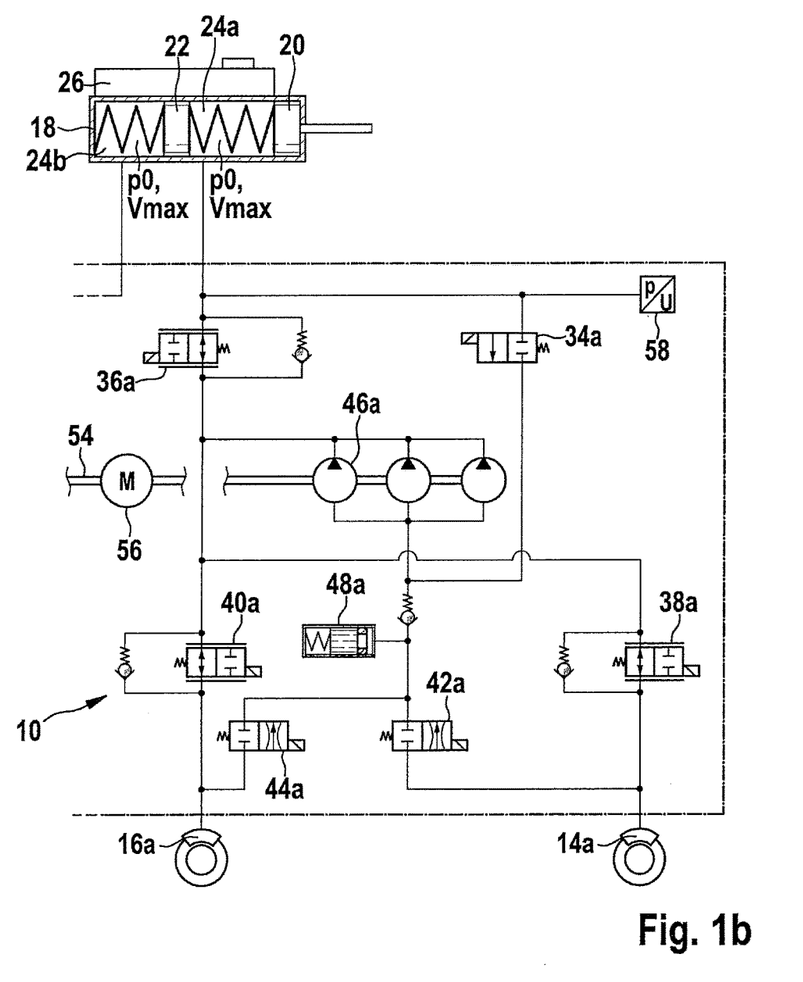

FIG. 1b shows a partial view of the brake system during an instance of non-manipulation of brake actuating element 28, which is in its starting position. The at least one displaceable piston 20 and 22 of master brake cylinder 18, such as rod piston 20 and floating piston 22, may also be in its starting position. Thus, the volume of the at least one pressure chamber 24a and 24b of master brake cylinder 18 has a maximum magnitude Vmax. Consequently, a minimum pressure p0, for example, corresponding to atmospheric pressure, is present in the at least one pressure chamber 24a and 24b of master brake cylinder 18.

Figure 1C:
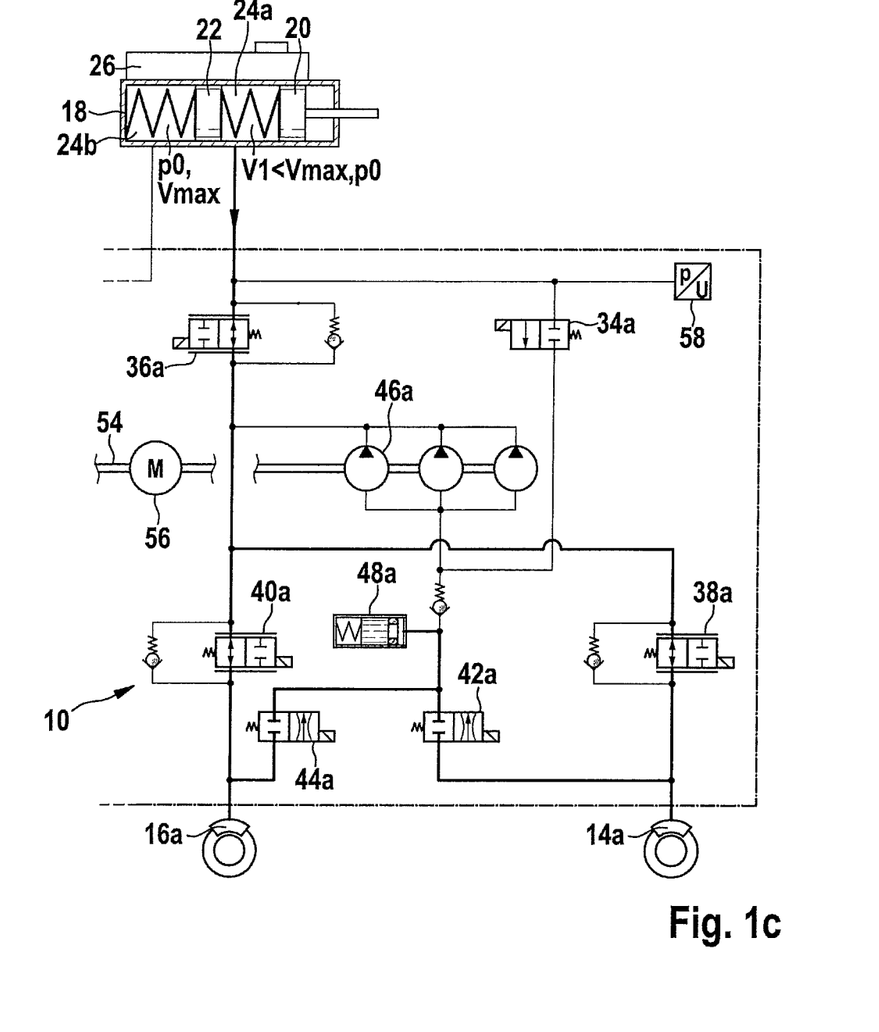

FIG. 1c shows a schematic view of the brake system while the driver manipulates brake actuating element 28 and a generator (not shown) of the recuperative brake system is simultaneously used. One may also describe this as the generator being controlled in a state in which a generator braking torque not equal to zero is exerted on at least one of the wheels.

In order to blend a generator braking torque (not equal to zero) of the generator of the recuperative brake system having the two brake circuits 10 and 12, one of the at least two brake circuits 10 and 12 of the brake system is controlled in a blending mode. This is accomplished by at least partially enabling a hydraulic connection between master brake cylinder 18 and a storage volume (e.g., accumulator 48a or 48b) of the brake circuit 10 or 12 controlled in the blending mode. This may also be described as opening the storage volume (e.g., accumulator 48a or 48b) of the brake circuit 10 or 12 controlled in the blending mode. In this manner, it may be ensured that brake fluid is transferred from master brake cylinder 18 into the storage volume (e.g., accumulator 48a or 48b) of the brake circuit 10 or 12 controlled in the blending mode. The use of first brake circuit 10 as the brake circuit 10 or 12 controlled in the blending mode, which is represented in FIG. 1c, is only to be interpreted as an example. As explained below in more detail, the method step represented by FIG. 1c may also be executed by second brake circuit 12.

During the execution of the above-described method step, another of the at least two brake circuits 10 and 12 is controlled in a non-blending mode. This may be second brake circuit 12, for example. In order to control the other of at least two brake circuits 10 and 12 in the non-blending mode, a hydraulic connection between master brake cylinder 18 and a storage volume (e.g., accumulator 48a or 48b) of the brake circuit 10 or 12 controlled in the non-blending mode is interrupted during the non-blending mode. This may also be described as closing the storage volume (e.g., accumulator 48a or 48b) of the brake circuit 10 or 12 controlled in the non-blending mode.

Consequently, in the method represented here, there is no (simultaneous) enabling of a first hydraulic connection between master brake cylinder 18 and a storage volume of first brake circuit 10, and of a second hydraulic connection between master brake cylinder 18 and a storage volume of second brake circuit 12. Instead, only one of the two hydraulic connections is enabled, while the other of the two hydraulic connections is interrupted. During the execution of the method for blending the generator braking torque described with the aid of FIG. 1c, the two hydraulic connections/storage volumes (accumulators 48a and 48) are never mistakenly enabled/open simultaneously.

The procedure described here for blending the generator braking torque not equal to zero has the advantage, that even in the case of an unrecognized functional impairment/undetected functional breakdown of the generator while the generator is being controlled to produce a setpoint generator braking torque not equal to zero, only one hydraulic connection between master brake cylinder 18 and the storage volume of the brake circuit 10 or 12 controlled in the blending mode is open, while the (other) hydraulic connection between master brake cylinder 18 and the storage volume of the brake circuit 10 or 12 controlled in the non-blending mode is closed/interrupted. Consequently, a braking pressure in the at least one wheel brake caliper 14a, 14b, 16a and 16b may already be built up by the driver's braking force after only the storage volume of the brake circuit 10 or 12 controlled in the blending mode is filled, while the storage volume of the brake circuit 10 or 12 controlled in the non-blending mode does not have to be filled for building up braking pressure in the at least one wheel brake caliper 14a, 14b, 16a and 16b. This may also be described, such that the amount of brake fluid to be displaced out of master brake cylinder 18 prior to a pressure increase in the at least one wheel brake caliper 14a, 14b, 16a and 16b is reduced (from the conventional value corresponding to the total fill volume of the storage volume of the brake circuit 10 or 12 controlled in the blending mode and of the storage volume of the brake circuit 10 or 12 controlled in the non-blending mode) to the fill volume of the storage volume of the brake circuit 10 or 12 controlled in the blending mode.

Therefore, in order to build up the desired braking pressure in the at least one wheel brake caliper 14a, 14b, 16a and 16b, the driver does not have to displace brake fluid, via the driver's braking force, into the storage volumes of the two brake circuits 10 and 12, until the two storage volumes are completely filled. Instead, it is sufficient for the driver to press brake fluid, via the driver's braking force, into only the storage volume of the brake circuit 10 and 12 controlled in the blending mode. After this comparatively low expenditure of force/energy, the driver may reliably build up a hydraulic braking torque unequal to zero, and therefore, easily decelerate the vehicle, by further manipulating brake actuating element 28. Thus, even in the case of an unrecognized functional impairment/an undetected functional breakdown of the generator during triggering of the generator to produce a setpoint generator braking torque not equal to zero, the driver may still decelerate the vehicle comparatively comfortably. Consequently, the method for blending a generator braking torque represented in FIG. 1c provides an improved safety standard and greater user-friendliness.

Thus, when executing the method for blending the generator braking torque, the driver is never in the situation in which the two storage volumes (accumulators 48a and 48b) have to be filled before a hydraulic braking torque of at least one wheel brake caliper 14a, 14b, 16a and 16b can be built up. One may also describe this by stating that when the method for blending the generator braking torque is implemented, the pedal travel that is increased in the event of a fault is halved. In particular, the additional brake actuating travel (additional pedal travel), which must be carried out to fill the storage volume of the brake circuit 10 or 12 controlled in the blending mode, and which slightly increases the brake actuating travel (pedal travel), is (nearly) unnoticeable to the driver.

The method for blending a generator braking torque, which is described in light of FIG. 1c, allows a sufficient recuperative efficiency. In particular, an increase in the recuperative efficiency is justified in that the method for blending the generator braking torque assists the driver in the modulation task in the case of replacing the regenerative braking torque. In the case of subsequent replacement of a decreasing generator braking torque, the volume of fluid discharged into the at least one storage volume for blending may be used for assisting the driver, as explained in more detail below. Consequently, it is not necessary to limit the generator braking torque to a value, which the driver can still easily replace using the dynamics applied to brake actuating element 28 by him or her.

As is apparent from FIG. 1c, floating piston 22 may remain in its starting position while first brake circuit 10 is controlled in the blending mode for blending the generator braking torque (not equal to zero). Consequently, only the volume of first pressure chamber 24a is reduced to a magnitude V1 less than maximum magnitude Vmax, while the volume of second pressure chamber 24b still has the maximum magnitude Vmax. By displacing brake fluid from first pressure chamber 24a into the storage volume of connected, first brake circuit 10, a pressure increase in both pressure chambers 24a and 24b, that is, in both brake circuits 10 and 12, may be prevented. Thus, (nearly) the minimum pressure p0 may be present in the two pressure chambers 24a and 24b.

For example, accumulator 48a or 48b may be used as a storage volume of a respective brake circuit 10 and 12. However, it should be pointed out that each of brake circuits 10 and 12 may also have an additional accumulator, which may be used as a storage volume for implementing the method for blending a generator braking torque. Therefore, the ability to implement the method is not limited to the use of an accumulator 48a or 48b.

For example, the hydraulic connection between master brake cylinder 18 and the storage volume of the brake circuit controlled in the blending mode may be at least partially enabled, by forcing, at least temporarily, at least one valve of the brake circuit 10 or 12 controlled in the blending mode into an at least partially open state. The valve forced at least temporarily into a partially open state may be at least one wheel exhaust valve 42a, 42b, 44a and 44b of the brake circuit 10 or 12 controlled in the blending mode. In the same manner, a high-pressure control valve 34a or 34b of the brake circuit 10 or 12 controlled in the blending mode may be at least temporarily forced, as the at least one valve, into an at least partially open state. (In this case, it is advantageous to dispense with equipping the recuperative brake system with pressure-relief valves 50a and 50b).

Correspondingly, the hydraulic connection between master brake cylinder 18 and the storage volume of the brake circuit 10 or 12 controlled in the non-blending mode may be interrupted during the non-blending mode, by forcing at least one valve of the brake circuit 10 or 12 controlled in the non-blending mode into its closed state during the non-blending mode. In addition, at least one wheel exhaust valve 42a, 42b, 44a or 44b and/or at least one high-pressure control valve 34a or 34b may be used for the valve controlled in this context. Consequently, as a rule, components already present in a brake system may be used to implement the method for blending a generator braking torque. This reduces the costs and the required space of a brake system for implementing the method for blending a generator braking torque.

However, it should be pointed out that the ability to implement the method described here is not limited to controlling at least one wheel exhaust valve 42a, 42b, 44a or 44b or at least one high-pressure control valve 34a or 34b. In place of, or in addition to valves 34a, 34b, 42a, 42b, 44a or 44b mentioned here, at least one further valve, via which the storage volume is connected to master brake cylinder 18, may also be controlled.

Figure 1D:
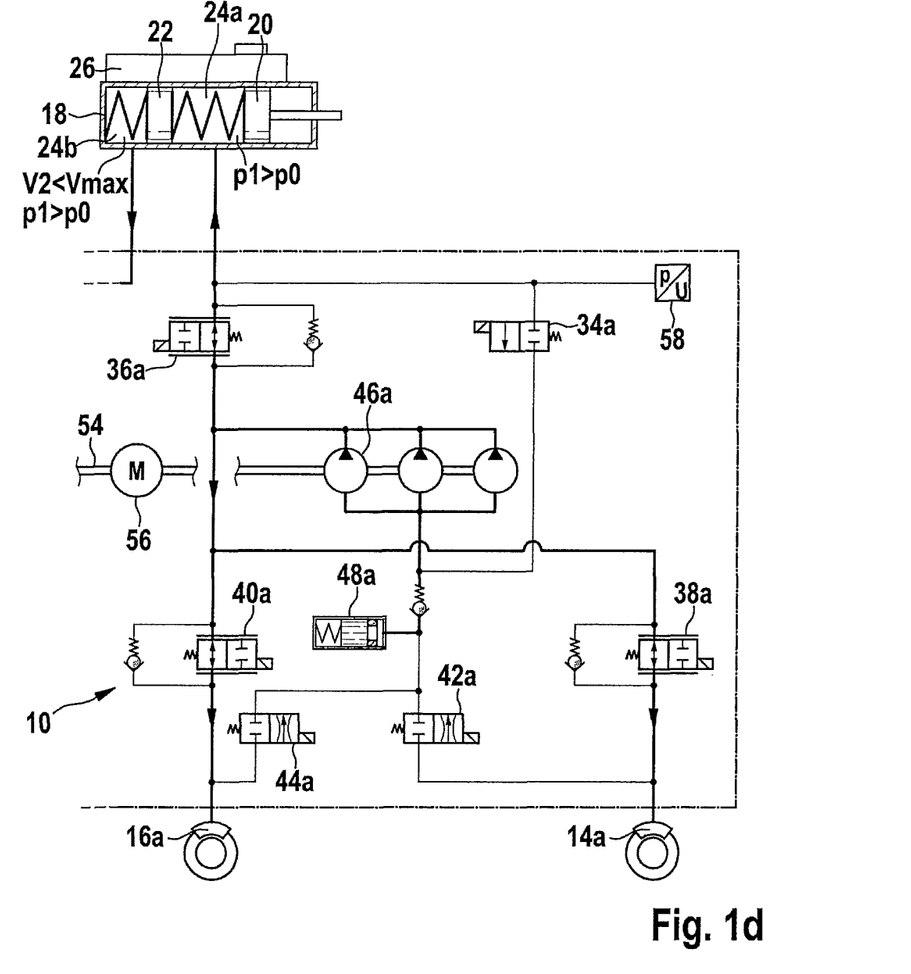

FIG. 1d shows a schematic partial view of the brake system for explaining an optional, further method step.

In the method step represented in FIG. 1d, a temporal decrease in the generator braking torque is compensated for, in that a braking pressure in at least one brake circuit 10 or 12 is built up by returning the brake fluid that was displaced earlier into the storage volume of the brake circuit 10 or 12 controlled in the braking mode. For example, in order to effect the return, a pump 46a or 46b of the brake circuit 10 or 12 controlled previously in the braking mode may be operated/forced into an active mode.

As is apparent from FIG. 1d, when master brake cylinder 18 is equipped with a floating piston 22, the return may cause the floating piston to be displaced from its starting position, and therefore, cause the volume of second pressure chamber 24b to be reduced to a magnitude V2 less than maximum magnitude Vmax. In this manner, a braking pressure p1 greater than minimum pressure p0 may be built up in the two brake circuits 10 and 12, and therefore, in all of wheel brake cylinders 14a, 14b, 16a and 16b. In particular, with the aid of the return, the same braking pressure p1 may be built up in the two pressure chambers 24a and 24b, i.e., in the two brake circuits 10 and 12.

Figure 2:
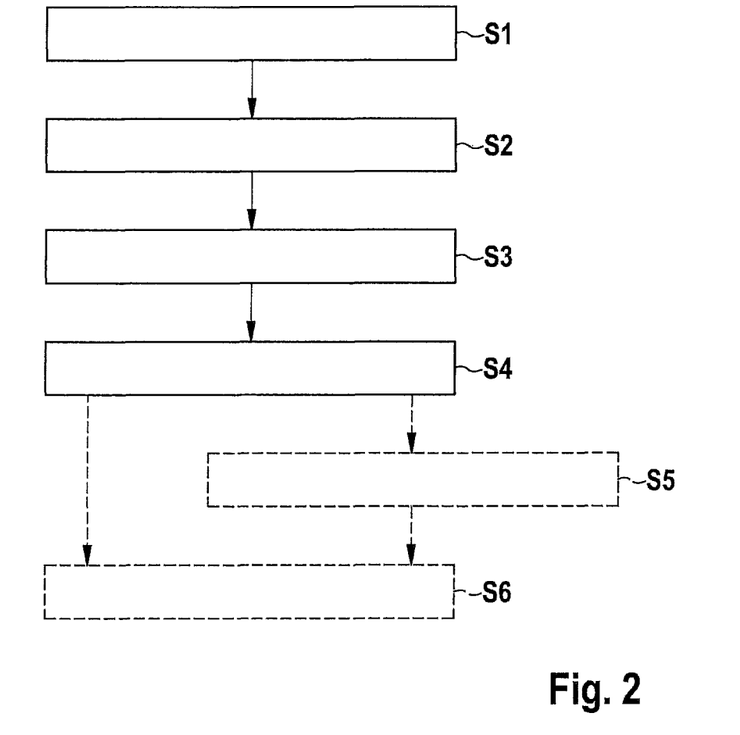
FIG. 2 shows a flow chart for representing a specific embodiment of the method for operating a recuperative brake system.

FIG. 2 shows a flow chart for representing a specific embodiment of the method for operating a recuperative brake system.

The method described in the following may be implemented, for example, using the above-described brake system. However, the ability to implement the method is not limited to the use of such a brake system. Instead, the method may be implemented using (nearly) any recuperative brake system of a vehicle having at least two brake circuits.

In a first method step S1, a braking intensity variable regarding a manipulation of a brake actuating element of the brake system by a driver of the vehicle is ascertained. The braking intensity variable may be, for example, a displacement/brake actuating travel of at least one displaceable component of the brake actuating element and/or of a component for transmitting the driver's braking force. However, the braking intensity variable is not limited to the values listed here.

In a method step S2, a setpoint generator braking torque of a generator of the brake system is set in view of at least the ascertained braking intensity variable. Optionally, the setpoint generator braking torque may be set in view of, in addition, at least one information item regarding a maximum generator braking torque able to be exerted. For example, in this context, a charging state of a chargeable vehicle battery and/or a current speed of the vehicle may be considered.

In a subsequent method step S3, the generator is controlled in view of the established setpoint generator braking torque in such a manner, that a generator braking torque corresponding to the setpoint generator braking torque is exerted on at least one wheel of the vehicle.

If a generator braking torque greater than a specified minimum generator braking torque is exerted by the controlled generator on at least one wheel of the vehicle, and the ascertained braking intensity is between a specified, first braking intensity value and a specified, second braking intensity value greater than the first braking intensity value, then a method step S4 is also executed. In method step S4, the at least two brake circuits of the brake system are controlled in accordance with the method for blending a generator braking torque. In this context, one of the at least two brake circuits is controlled in the blending mode, while another of the at least two brake circuits is controlled in the non-blending mode already described above. For example, in method step S4, a brake circuit set as a first brake circuit of the at least two brake circuits may be controlled in the blending mode, and another brake circuit of the at least two brake circuits, which is set as a second brake circuit, may be controlled in the non-blending mode.

For example, a braking intensity variable equal to zero may be selected as a first braking intensity value. The second specified braking intensity value may be a maximum exertable/ascertainable braking intensity variable. As an alternative to that, using the at least two braking intensity values, the ability to implement the method for blending a generator braking torque may also be limited to a range of the braking intensity variable which may be used for this. The specified minimum generator braking torque may be selected to be equal to zero or equal to a desired blending threshold value.

In one advantageous further refinement of the method, it also includes a method step S5, which is executed if a generator braking torque greater than a specified minimum generator braking torque is exerted by the controlled generator and the ascertained braking intensity variable is between the specified, second braking intensity value and a specified, third braking intensity value greater than the second braking intensity value. For example, in method step S5, the second brake circuit may be controlled in the blending mode and the first brake circuit may be controlled in the non-blending mode. One may also describe this, such that at or above a braking intensity variable of the manipulation of the brake actuating element, which is equal to the specified, second brake actuating value, the first hydraulic connection of the first brake circuit is closed/interrupted, and the second hydraulic connection of the second brake circuit is simultaneously opened. Therefore, in this case, only a maximum of one of the at least two brake circuits is always controlled in the blending mode while method steps S4 and S5 are executed. Thus, during the initial brake manipulation, the volume of brake fluid displaced by the driver is displaced exclusively into a storage volume of the first brake circuit, while in the event of further/more intense manipulation of the brake actuating element, the displaced volume of brake fluid is transferred exclusively into a storage volume of the second brake circuit. In response to brake manipulation equal to the specified, third braking intensity value, the two hydraulic connections may be closed. Therefore, in particular, in the event of intense brake manipulation, it is ensured that the driver's braking force may be used for building up a hydraulic braking torque. Using the strategy of method step S5 described here, any existing tolerances may easily be circumvented in the filling of the storage volumes. In addition, distribution of the collective loading over different storage volumes of the at least two brake circuits is effected by method step S5. Using pressure/volume monitoring carried out during method step S5, pedal travel that is overly long may be prevented in the event of a failure of the generator. In addition, a simplified volume approximation may be used to that end.

As an alternative to the specific embodiment described above, in method step S5, the first brake circuit and the second brake circuit may also be controlled in the blending mode. This may be accomplished by enabling the hydraulic connection between the master brake cylinder and the storage volume of the first brake circuit and the hydraulic connection between the master brake cylinder and the storage volume of the second brake circuit. This may also be described, such that at or above a braking intensity variable equal to the second braking intensity value, for example, at or above a corresponding pedal travel, the hydraulic connection between the master brake cylinder and the storage volume of the second brake circuit is additionally enabled, and consequently, the storage volume of the second brake circuit may also be filled.

In one advantageous further refinement, the method includes an additional method step S6, which is carried out after execution of the method, that is, after execution of method steps S1 through S4 or S1 through S5. Method step S6 may be executed while/after the vehicle is accelerated again. In one advantageous variant, in method step S6, the first brake circuit is reset as the second brake circuit, and the second brake circuit is reset as the first brake circuit. One may also describe this as a constant permutation of the opening order. In this manner, the opening order may be changed in response to each actuation of the brakes.

For example, during a first actuation of the brakes, a brake circuit connected to a front pressure chamber of the master brake cylinder may initially be operated as a first brake circuit, while a brake circuit connected to a rear pressure chamber of the master brake cylinder is operated as a second brake circuit. In this case, in the event of blending, the volume of brake fluid pressed out of the master brake cylinder is initially displaced completely into the storage volume of the brake circuit connected to the front pressure chamber of the master brake cylinder. If the driver increases the brake actuating intensity, then the hydraulic connection between the master brake cylinder and the storage volume of the brake circuit connected to the front pressure chamber of the master brake cylinder may additionally be interrupted/closed, and instead, the hydraulic connection between the master brake cylinder and the storage volume of the brake circuit connected to the rear pressure chamber of the master brake cylinder may be enabled/opened. In response to a second, subsequent actuation of the brakes (e.g., after the vehicle has been accelerated in the meantime), the brake circuit connected to the rear pressure chamber of the master brake cylinder is initially operated as a first brake circuit, while the brake circuit connected to the front pressure chamber of the master brake cylinder is controlled as a second brake circuit. In addition, in the event of blending, the hydraulic connection between the master brake cylinder and the storage volume of the brake circuit connected to the rear pressure chamber of the master brake cylinder is initially opened, while subsequently, at or above a particular brake actuating intensity, the hydraulic connection between the master brake cylinder and the storage volume of the brake circuit connected to the front pressure chamber of the master brake cylinder is exclusively enabled/opened. The permutation of the opening order described here may be repeated as often as needed.

As an alternative, in method step S6, the opening order may also be set in light of a cumulative, received volume of, in each instance, a storage volume of the at least two brake circuits. This may be implemented by comparing, in method step S6, a first variable regarding a total fluid volume received during operation of a storage volume of one of the at least two brake circuits, to at least a second variable regarding a total fluid volume received during operation of a storage volume of another of the at least two brake circuits. Subsequently, the brake circuit having the minimum variable of at least the first variable and the second variable may be reset as the first brake circuit. Under the assumption that always, only one hydraulic connection is open at the same time, the cumulatively received volume, that is, the first variable and/or the second variable, may be derived/calculated from the measured brake actuating variable. This cumulative, received volume of a storage volume, such as an accumulator, may determine which storage volume is opened first. The storage volume, which, up to now, has received the lowest cumulative volume and therefore has experienced the lowest loading, may always be opened first.

A more uniform load distribution may be achieved with the aid of method step S6. Since the at least two hydraulic connections are no longer open at the same time, the storage volume that actually receives a volume of brake fluid forced out of the master brake cylinder is no longer a function of the manufacturing tolerances of the individual storage volumes. This ensures that a total collective loading may be distributed more uniformly over the storage volumes with the aid of method step S6. Consequently, a failure of a storage volume due to excessive loading may be prevented. This may render a repair or exchange of an excessively loaded storage volume unnecessary.

Figure 3:
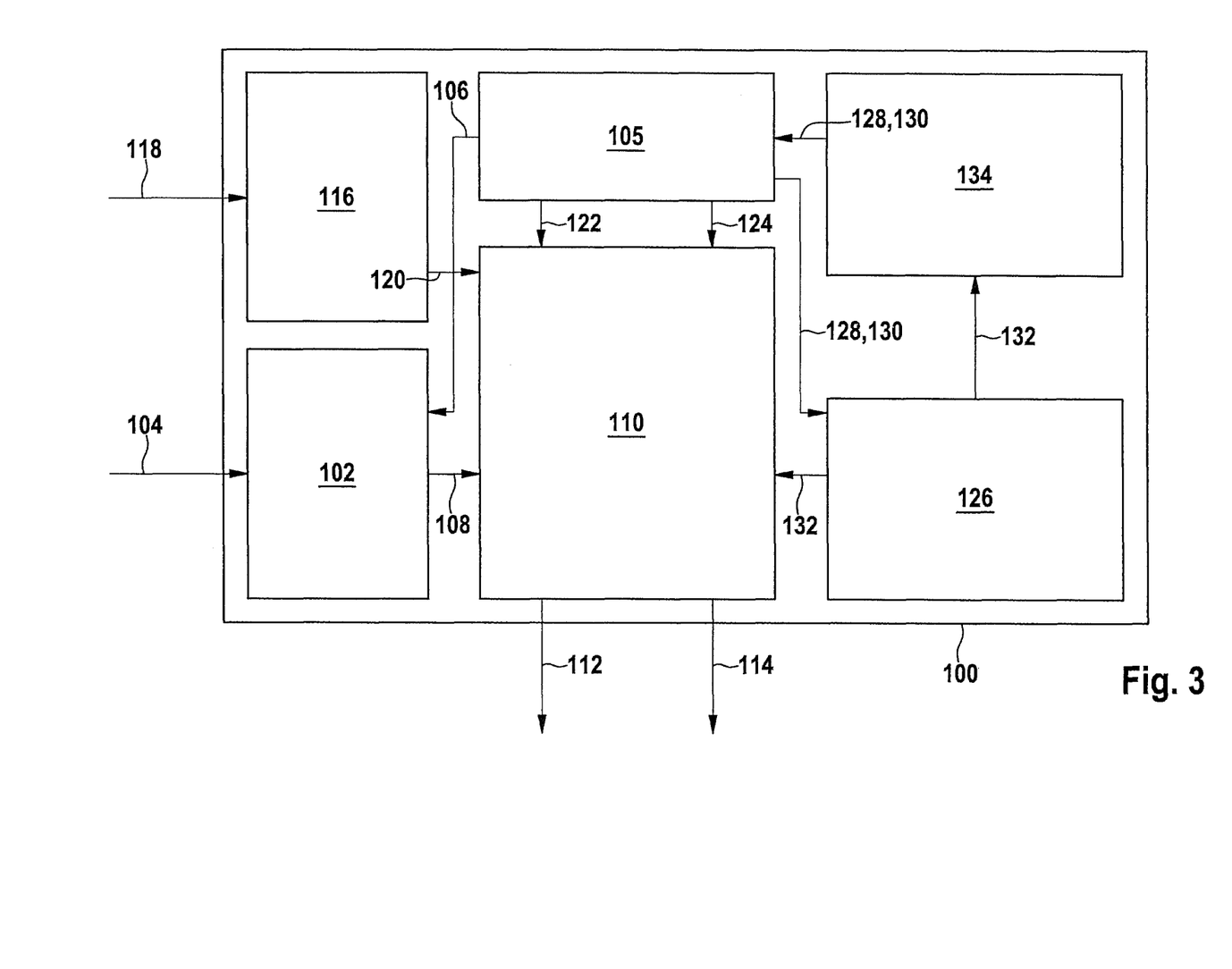
FIG. 3 shows a schematic representation of a specific embodiment of the control device.

FIG. 3 shows a schematic representation of a specific embodiment of the control device.

The control device 100 schematically represented in FIG. 3 may be used, in particular, in a recuperative brake system having two brake circuits. For example, control device 100 may be used in the brake system described above. However, the use of control device 100 is not limited to such a brake system.

Control device 100 has a first receiving device 102, with the aid of which an information item 104 regarding an exerted or exertable generator braking torque of a generator (not shown) may be received. If at least the exerted or exertable generator braking torque is greater than a comparison information item 106, which is provided by a storage unit 105 and regards a specified minimum generator braking torque, an output signal 108 corresponding to the exerted or exertable generator braking torque may be output. If the minimum generator braking torque is equal to zero, then a comparison of information item 104 to a comparison information item 106 regarding the minimum generator braking torque may also be omitted.

Information item 104 may be provided to control device 100 by an external sensor. As an alternative to that, control device 100 may also be configured to set the generator braking torque to be exerted or the exertable generator braking torque itself. In this case, first receiving device 102 is an internal receiving device/relaying device of control device 100.

Control device 100 also includes a control element 110, which may be controlled by output signal 108 in such a manner, that if the exerted or exertable generator braking torque is greater than the specified minimum generator braking torque 106, one of the at least two brake circuits of the brake system may be controlled in a blending mode by a first control signal 112 output by control element 110. The controlling of the brake circuit in the blending mode is accomplished by at least temporarily enabling/opening a hydraulic connection between a master brake cylinder of the brake system and a storage volume of the brake circuit controlled in the blending mode. In addition, if the exerted or exertable generator braking torque is greater than the specified minimum generator braking torque, another of the at least two brake circuits may be controlled in a non-blending mode by a second control signal 114 output by control element 110. Consequently, using second control signal 114, a hydraulic connection between the master brake cylinder and a storage volume of the brake circuit controlled in the non-blending mode may be interrupted/closed during the non-blending mode.

For example, at least one valve of the brake circuit controlled in the blending mode may be forced by first control signal 112 at least temporarily into an at least partially open state, while at least one valve of the brake circuit controlled in the non-blending mode may be forced by the second control signal into its closed state during the non-blending mode. Exemplary embodiments for valves controllable by control signals 112 and 114 are already mentioned above.

In one advantageous further refinement, the control device 100 also includes a second receiving device 116, by which a braking intensity signal 118 may be received and a braking intensity variable 120 corresponding to braking intensity signal 118 may be provided. In this case, control element 110 may also be configured to compare supplied braking intensity variable 120 to at least a specified, first braking intensity value 122 and a specified, second braking intensity value 124 greater than first braking intensity value 122. If the exerted or exertable generator braking torque is greater than the specified minimum braking torque and the braking intensity variable is between the specified, first braking intensity value and the specified, second braking intensity value, control element 110 may be additionally configured to control a brake circuit of the at least two brake circuits, which is set as a first brake circuit, in the blending mode, and to control a further brake circuit of the at least two brake circuits, which is set as a second brake circuit, in the non-blending mode.

In addition, if the exerted or exertable generator braking torque is greater than the specified minimum generator braking torque and braking intensity variable 120 is greater than specified, second braking intensity value 124, control element 110 may be additionally configured to control at least the second brake circuit in the blending mode. According to the specific embodiment, if the exerted or exertable generator braking torque is greater than the specified minimum generator braking torque and braking intensity variable 120 is greater than specified, second braking intensity value 124, the first brake circuit may be controlled in the blending mode or in the non-blending mode. This provides the advantages already described above of uniform use of the storage volumes of the at least two brake circuits.

In a further refinement, control device 100 additionally includes a comparison device 126, with the aid of which a first variable 128 regarding a total fluid volume received during operation of a storage volume of one of the at least two brake circuits may be compared to at least a second variable 130 regarding a total fluid volume received during operation of a storage volume of another of the at least two brake circuits. In addition, comparison device 126 is advantageously configured to reset the brake circuit having the minimum variable of at least the first variable and the second variable as the first brake circuit, and to output a corresponding brake-circuit setting information item 132 to control element 110. Consequently, the advantages of setting the opening order in light of the cumulative, received volume may also be achieved, using control element 110.

Variables 128 and 130 may be provided either by an external sensor, by an external control unit, or by storage unit 105. For example, a storage volume monitoring unit 134 of the control device may be configured to set variables 128 and 130 in view of at least information item 104/output signal 108, braking intensity variable 120 and/or brake-circuit setting information item 132, and to output them to storage unit 105.

The above-mentioned advantages are also provided in a regenerative brake system having control device 100. The brake system may also have at least one of the above-described brake system components. Therefore, a further description of the brake system is omitted here.

What is claimed is:

1. A method for blending a generator braking torque of a generator of a recuperative brake system having two brake circuits, the method involving an execution by a control device of code stored in a non-transitory recording medium, the method comprising:
controlling one of the at least two brake circuits of the brake system in a blending mode, a first hydraulic connection between a master brake cylinder of the brake system and a storage volume of the brake circuit being controlled in the blending mode being at least temporarily enabled when a brake actuating element is actuated by a driver, so that brake fluid is transferred from the master brake cylinder into the storage volume of the brake circuit controlled in the blending mode; and
controlling another of the at least two brake circuits in a non-blending mode, a second hydraulic connection between the master brake cylinder and a storage volume of the brake circuit being controlled in the non-blending mode being interrupted during the non-blending mode;
wherein if a generator braking torque greater than a specified minimum generator braking torque is exerted by the controlled generator and an ascertained braking intensity variable is between a specified, second braking intensity value and a specified, third braking intensity value, the first brake circuit and the second brake circuit are controlled in the blending mode,
wherein at a time when the blending mode of the one of the at least two brake circuits and the non-blending mode of the other of the at least two brake circuits are implemented:
a simultaneous enablement of the first and second hydraulic connections is prevented, and
as between the first and second hydraulic connections, only the first hydraulic connection is enabled.

2. The method of claim 1, wherein at least one of the following is satisfied:
(i) the first hydraulic connection between the master brake cylinder and the storage volume of the brake circuit controlled in the blending mode is at least temporarily enabled, by forcing at least one valve of the brake circuit controlled in the blending mode at least temporarily into an at least partially open state; and
(ii) the second hydraulic connection between the master brake cylinder and the storage volume of the brake circuit controlled in the non-blending mode is interrupted, by forcing at least one valve of the brake circuit controlled in the non-blending mode into its closed state during the non-blending mode.

3. The method as recited in claim 2, wherein:
the at least one valve of the first brake circuit controlled in the blending mode is connected between the master brake cylinder and the storage volume of the first brake circuit, and
the at least one valve of the second brake circuit controlled in the non-lending mode is connected between the master brake cylinder and the storage volume of the second brake circuit.

4. The method of claim 2, wherein at least one of the following is satisfied:
(i) at least one wheel exhaust valve, as the at least one valve of the brake circuit controlled in the blending mode, is forced at least temporarily into an at least partially open state; and
(ii) at least one wheel exhaust valve, as the at least one valve of the brake circuit controlled in non-blending mode, is forced into its closed state during the non-blending mode.

5. The method of claim 2, wherein at least one of the following is satisfied:
(i) a high-pressure control valve, as the at least one valve of the brake circuit controlled in the blending mode, is forced at least temporarily into an at least partially open state; and
(ii) a high-pressure control valve, as the at least one valve of the brake circuit controlled in the non-blending mode, is forced into its closed state during the non-blending mode.

6. A method for operating a recuperative brake system of a vehicle having at least two brake circuits, the method involving an execution by a control device of code stored in a non-transitory recording medium, the method comprising:
ascertaining a braking intensity variable regarding a manipulation of a brake actuating element of the brake system by a driver of the vehicle;
setting a setpoint generator braking torque of a generator of the brake system in view of at least the ascertained braking intensity variable;
controlling the generator in view of the established setpoint generator braking torque, so that a generator braking torque corresponding to the setpoint generator braking torque is exerted on at least one wheel of the vehicle; and
if a generator braking torque greater than a specified minimum generator braking torque is exerted by the controlled generator on the at least one wheel of the vehicle and the ascertained braking intensity variable is between a specified, first braking intensity value and a specified, second braking intensity value greater than the first braking intensity value, controlling the at least two brake circuits of the brake system in accordance with blending a generator braking torque of the generator of a recuperative brake system having the two brake circuits, by performing the following:
controlling one of the at least two brake circuits of the brake system in a blending mode, a first hydraulic connection between a master brake cylinder of the brake system and a storage volume of the brake circuit being controlled in the blending mode being at least temporarily enabled when the brake actuating element is actuated by the driver, so that brake fluid is transferred from the master brake cylinder into the storage volume of the brake circuit controlled in the blending mode; and
controlling another of the at least two brake circuits in a non-blending mode, a second hydraulic connection between the master brake cylinder and a storage volume of the brake circuit being controlled in the non-blending mode being interrupted during the non-blending mode;
wherein if a generator braking torque greater than a specified minimum generator braking torque is exerted by the controlled generator and an ascertained braking intensity variable is between a specified, second braking intensity value and a specified, third braking intensity value, the first brake circuit and the second brake circuit are controlled in the blending mode,
wherein at a time when the blending mode of the one of the at least two brake circuits and the non-blending mode of the other of the at least two brake circuits are implemented:
a simultaneous enablement of the first and second hydraulic connections is prevented, and
as between the first and second hydraulic connections, only the first hydraulic connection is enabled.

7. The method of claim 6, wherein if a generator braking torque greater than the specified minimum generator braking torque is exerted by the controlled generator and the ascertained braking intensity variable is between the specified, first braking intensity value and the specified, second braking intensity value, a brake circuit of the at least two brake circuits, which is set as a first brake circuit, is controlled in the blending mode, and another brake circuit of the at least two brake circuits, which is set as a second brake circuit, is controlled in the non-blending mode.

8. The method of claim 7, wherein if a generator braking torque greater than the specified minimum generator braking torque is exerted by the controlled generator and the ascertained braking intensity variable is between the specified, second braking intensity value and a specified, third braking intensity value greater than the second braking intensity value, the second brake circuit is controlled in the blending mode, and the first brake circuit is controlled in the non-blending mode.

9. The method of claim 7, wherein if a generator braking torque greater than the specified minimum generator braking torque is exerted by the controlled generator and the ascertained braking intensity variable is between the specified, second braking intensity value and the specified, third braking intensity value, the first brake circuit and the second brake circuit are controlled in the blending mode.

10. The method of claim 6, wherein after the method is executed, the first brake circuit is reset as the second brake circuit, and the second brake circuit is reset as the first brake circuit.

11. The method of claim 6, wherein after the method is executed, a first variable regarding a total fluid volume received during operation of a storage volume of one of the at least two brake circuits is compared to at least a second variable regarding a total fluid volume received during operation of a storage volume of another of the at least two brake circuits, and wherein the brake circuit having the minimum variable of at least the first variable and the second variable is reset as the first brake circuit.

12. A control device for a recuperative brake system having two brake circuits, comprising:
   a first receiving device, by which an information item regarding an exerted or exertable generator braking torque of a generator is receivable, and by which an output signal corresponding to the exerted or exertable generator braking torque is outputtable if at least the exerted or exertable generator braking torque is greater than a specified minimum generator braking torque; and
   a control element, which is controllable by the output signal so that if the exerted or exertable generator braking torque is greater than the specified minimum generator braking torque, one of the at least two brake circuits of the brake system is controllable in a blending mode by a first control signal output by the control element, so that a first hydraulic connection between a master brake cylinder of the brake system and a storage volume of the brake circuit controlled in the blending mode can be enabled at least temporarily when a brake actuating element is actuated by a driver, and another of the at least two brake circuits is controllable in a non-blending mode by a second control signal output by the control element so that a second hydraulic connection between the master brake cylinder and a storage volume of the brake circuit controlled in the non-blending mode is interruptable during the non-blending mode,
   wherein at a time when the blending mode of the one of the at least two brake circuits and the non-blending mode of the other of the at least two brake circuits are implemented:
      a simultaneous enablement of the first and second hydraulic connections is prevented, and
      as between the first and second hydraulic connections, only the first hydraulic connection is enabled.

13. The control device of claim 12, wherein at least one of the following is satisfied:
   (i) at least one valve of the brake circuit controlled in the blending mode is at least temporarily forceable into an at least partially open state by the first control signal, and
   (ii) at least one valve of the brake circuit controlled in the non-blending mode is forceable by the second control signal into its closed state during the non-blending mode.

14. The control device of claim 12, further comprising:
   a second receiving device, by which a braking intensity signal is receivable and a braking intensity variable corresponding to the braking intensity signal can be provided;
   wherein the control element is further configured to compare the provided braking intensity variable to at least a specified, first braking intensity value and a specified, second braking intensity value greater than the first braking intensity value, and
   wherein if the exerted or exertable generator braking torque is greater than the specified minimum generator braking torque and the braking intensity variable is between the specified, first braking intensity value and the specified, second braking intensity value, the control element is configured to control a brake circuit of the least two brake circuits, which is set as a first brake circuit, in the blending mode, and to control another brake circuit of the at least two brake circuits, which is set as a second brake circuit, in the non-blending mode.

15. The control device of claim 14, wherein if the exerted or exertable generator braking torque is greater than the specified minimum generator braking torque and the braking intensity variable is greater than the specified, second braking intensity variable, the control element is additionally configured to control at least the second brake circuit in the blending mode.

16. The control device of claim 14, further comprising:
   a comparison device to compare a first variable of a total fluid volume received during operation of a storage volume of one of the at least two brake circuits to at least a second variable of a total fluid volume received during operation of a storage volume of another of the at least two brake circuits, the comparison device being configured to reset the brake circuit having the minimum variable of at least the first variable and the second variable as the first brake circuit.

17. The control device as recited in claim 12, wherein:
   the at least one valve of the first brake circuit controlled in the blending mode is connected between the master brake cylinder and the storage volume of the first brake circuit, and
   the at least one valve of the second brake circuit controlled in the non-lending mode is connected between the master brake cylinder and the storage volume of the second brake circuit.

18. A regenerative brake system, comprising:
   a control device for a recuperative or regenerative brake system having two brake circuits, including:
      a first receiving device, by which an information item regarding an exerted or exertable generator braking torque of a generator is receivable, and by which an output signal corresponding to the exerted or exertable generator braking torque is outputtable if at least the exerted or exertable generator braking torque is greater than a specified minimum generator braking torque; and
      a control element, which is controllable by the output signal so that if the exerted or exertable generator braking torque is greater than the specified minimum generator braking torque, one of the at least two brake circuits of the brake system is controllable in a blending mode by a first control signal output by the control element, so that a first hydraulic connection between a master brake cylinder of the brake system and a storage volume of the brake circuit controlled in the blending mode can be enabled at least temporarily when a brake actuating element is actuated by a driver, and another of the at least two brake circuits is controllable in a non-blending mode by a second control signal output by the control element so that a second hydraulic connection between the master brake cylinder and a storage volume of the brake circuit controlled in the non-blending mode is interruptable during the non-blending mode, wherein at a time when the blending mode of the one of the at least two brake circuits and the non-blending mode of the other of the at least two brake circuits are implemented:
         a simultaneous enablement of the first and second hydraulic connections is prevented, and as between the first and second hydraulic connections, only the first hydraulic connection is enabled.

19. A method for blending a generator braking torque of a generator of a recuperative brake system having two brake circuits, the method involving an execution by a control device of code stored in a non-transitory recording medium, the method comprising:

controlling one of the at least two brake circuits of the brake system in a blending mode, a first hydraulic connection between a master brake cylinder of the brake system and a storage volume of the brake circuit being controlled in the blending mode being at least temporarily enabled when a brake actuating element is actuated by a driver, so that brake fluid is transferred from the master brake cylinder into the storage volume of the brake circuit controlled in the blending mode; and controlling another of the at least two brake circuits in a non-blending mode, a second hydraulic connection between the master brake cylinder and a storage volume of the brake circuit being controlled in the non-blending mode being interrupted during the non-blending mode, wherein if a generator braking torque greater than a specified minimum generator braking torque is exerted by the controlled generator and an ascertained braking intensity variable is between a specified, second braking intensity value and a specified, third braking intensity value, the first brake circuit and the second brake circuit are controlled in the blending mode;

comparing, after the foregoing tasks are executed, a first variable regarding a total fluid volume received during operation of a storage volume of one of the at least two brake circuits to at least a second variable regarding a total fluid volume received during operation of a storage volume of another of the at least two brake circuits; and resetting the brake circuit having the minimum variable of at least the first variable and the second variable as the first brake circuit, wherein at a time when the blending mode of the one of the at least two brake circuits and the non-blending mode of the other of the at least two brake circuits are implemented:

a simultaneous enablement of the first and second hydraulic connections is prevented, and as between the first and second hydraulic connections, only the first hydraulic connection is enabled.

* * * * *